US012573669B2

(12) United States Patent
Lepiorz et al.

(10) Patent No.: US 12,573,669 B2
(45) Date of Patent: Mar. 10, 2026

(54) SAFETY DEVICE FOR BATTERY PACKS HAVING POUCH CELLS BY MECHANICAL INTERRUPTERS

(71) Applicant: Hilti Aktiengesellschaft, Schaan (LI)

(72) Inventors: Matthias Lepiorz, Chemnitz (DE); Robert Stanger, Kaufbeuren (DE); Moses Ender, Buchs (CH); Bernd Ziegler, Schwabmuenchen (DE); Klaus Hauser, Schwabmuenchen (DE); Nora Martiny, Herrsching-Breitbrunn (DE); Kathrin Sax, Scheuring (DE)

(73) Assignee: Hilti Aktiengesellschaft, Schaan (LI)

( * ) Notice: Subject to any disclaimer, the term of this patent is extended or adjusted under 35 U.S.C. 154(b) by 351 days.

(21) Appl. No.: 17/058,901

(22) PCT Filed: Jun. 25, 2019

(86) PCT No.: PCT/EP2019/066743
§ 371 (c)(1),
(2) Date: Nov. 25, 2020

(87) PCT Pub. No.: WO2020/007641
PCT Pub. Date: Jan. 9, 2020

(65) Prior Publication Data
US 2021/0218072 A1 Jul. 15, 2021

(30) Foreign Application Priority Data
Jul. 3, 2018 (EP) .................................... 18181413

(51) Int. Cl.
*H01M 10/00* (2006.01)
*H01M 10/42* (2006.01)
(Continued)

(52) U.S. Cl.
CPC ..... *H01M 10/4235* (2013.01); *H01M 10/425* (2013.01); *H01M 50/211* (2021.01);
(Continued)

(58) Field of Classification Search
CPC ........... H01M 10/4235; H01M 10/425; H01M 50/211; H01M 50/502; H01M 2200/103;
(Continued)

(56) References Cited

U.S. PATENT DOCUMENTS

| | | | | |
|---|---|---|---|---|
| 2006/0267545 A1* | 11/2006 | Lee | ...................... | H01M 50/284 320/106 |
| 2008/0241671 A1* | 10/2008 | Cherng | ............. | H01M 10/0525 429/163 |

(Continued)

FOREIGN PATENT DOCUMENTS

| | | |
|---|---|---|
| CN | 103296322 A | 9/2013 |
| CN | 103493255 A | 1/2014 |

(Continued)

OTHER PUBLICATIONS

See ISR of PCT/EP2019/066743 dated Oct. 2, 2019.

*Primary Examiner* — Nicholas P D'Aniello
(74) *Attorney, Agent, or Firm* — Davidson Kappel LLC

(57) ABSTRACT

A rechargeable battery pack having at least one pouch cell, wherein the rechargeable battery pack has at least one interrupter, which is designed to at least temporarily interrupt a current draw from the pouch cell and/or from the rechargeable battery pack, wherein the interrupter is tripped by an expansion of the at least one pouch cell.

3 Claims, 5 Drawing Sheets

(51) Int. Cl.
  *H01M 50/211* (2021.01)
  *H01M 50/51* (2021.01)
  *H01M 50/578* (2021.01)

(52) U.S. Cl.
  CPC ......... *H01M 50/51* (2021.01); *H01M 50/578* (2021.01); *H01M 2200/103* (2013.01)

(58) Field of Classification Search
  CPC ........... H01M 50/581; H01M 2200/10; H01M 2220/30; Y02E 60/10
  See application file for complete search history.

(56) References Cited

U.S. PATENT DOCUMENTS

| | | | | |
|---|---|---|---|---|
| 2011/0039147 A1* | 2/2011 | Cheon | .................. | H01M 50/581 |
| | | | | 429/159 |
| 2013/0337297 A1 | 12/2013 | Lee et al. | | |
| 2014/0062418 A1* | 3/2014 | Lim | .................... | H01M 50/578 |
| | | | | 320/137 |
| 2014/0065452 A1* | 3/2014 | Hjerpe | .................. | B60L 3/0046 |
| | | | | 429/61 |
| 2014/0248523 A1* | 9/2014 | Roh | .................... | H01M 50/578 |
| | | | | 429/121 |
| 2015/0044528 A1 | 2/2015 | Yang et al. | | |
| 2015/0162593 A1* | 6/2015 | Lee | ....................... | H04W 88/08 |
| | | | | 429/150 |
| 2016/0149197 A1* | 5/2016 | Kang | .................. | H01M 50/553 |
| | | | | 429/61 |
| 2016/0344004 A1 | 11/2016 | Kepler et al. | | |
| 2018/0053976 A1 | 2/2018 | Park et al. | | |
| 2018/0090793 A1 | 3/2018 | Choi et al. | | |
| 2018/0159185 A1 | 6/2018 | Choi et al. | | |

FOREIGN PATENT DOCUMENTS

| | | |
|---|---|---|
| CN | 105633494 A | 6/2016 |
| CN | 205438462 U | 8/2016 |
| CN | 107871840 A | 4/2018 |
| EP | 3121870 A1 | 1/2017 |
| KR | 20180064051 A | 6/2018 |

* cited by examiner

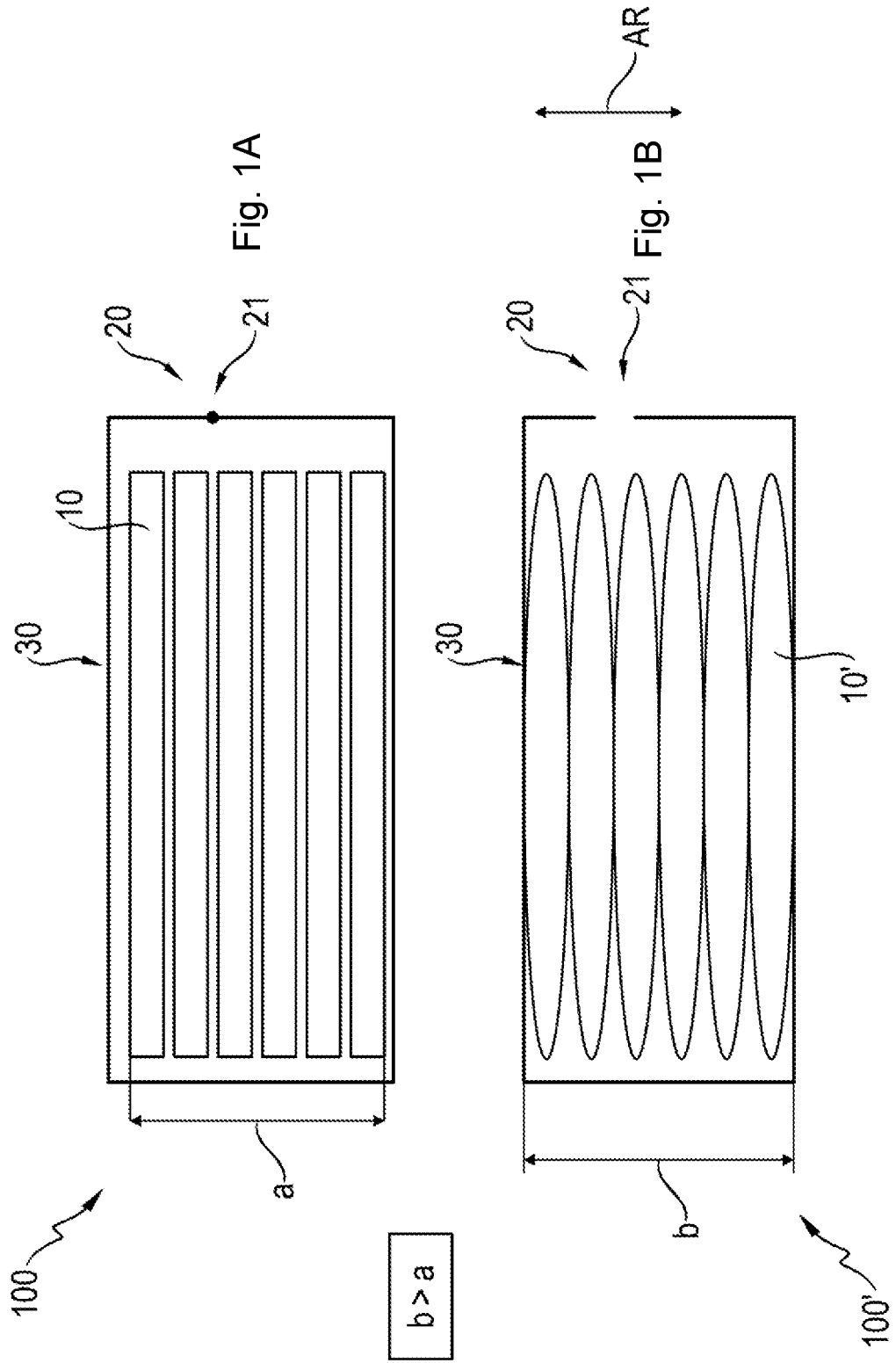

SAFETY DEVICE FOR BATTERY PACKS HAVING POUCH CELLS BY MECHANICAL INTERRUPTERS

The present invention relates to a rechargeable battery pack having at least one pouch cell.

BACKGROUND

Rechargeable battery packs and pouch cells are known in principle from the prior art. The phenomenon of what is known as swelling, also referred to as expansion, is likewise known from the prior art. This is problematic since it can lead to an outer cover of the pouch cell bursting open.

SUMMARY OF THE INVENTION

It is an object of the present invention to provide a rechargeable battery pack that provides the basis for increased operational safety.

The invention provides that the rechargeable battery pack has at least one interrupter, which is designed to at least temporarily interrupt a current draw from the pouch cell and/or from the rechargeable battery pack, wherein the interrupter is tripped by an expansion of the at least one pouch cell.

The invention includes the knowledge that cylindrical lithium ion cells of an identical, defined geometry have until now been used in rechargeable battery packs of the prior art for electrical hand-held power tools. In order to be able to meet the increasing performance requirements of rechargeable-battery-operated hand-held power tools, either the discharge current or the voltage of the rechargeable battery packs has to be increased. An increase in the rechargeable battery pack voltage leads to an increasing effort for the licensing process (for example as soon as the protective extra-low voltage is exceeded); to increase the discharge current, additional cylindrical cells must be connected in parallel, which increases the size and weight of the rechargeable battery packs. In order to make high-performance rechargeable battery packs light and compact, lithium ion pouch cells can be used instead of cylindrical cells. This is particularly the case with the rechargeable battery pack of the present invention. On account of their internal design, pouch cells exert a considerably lower internal resistance, as a result of which higher discharge currents can be realized without the rechargeable battery pack overheating. At the same time, lithium ion pouch cells can be produced with flexible geometries, as a result of which the rechargeable battery packs can be constructed in a lightweight and compact manner.

A rechargeable battery pack based on pouch cells can is particularly reliable owing to the interrupter provided according to the invention.

It has been recognized in particular that lithium ion pouch cells—in contrast to cylindrical battery cells of the prior art—are not intrinsically safe. If the pressure inside a pouch cell rises (for instance due to overcharging, short circuit or as a result of aging), the cells expand—which is also known as swelling—and can burst open in an uncontrolled manner. This creates an increased safety risk for the user, as fire can catch owing to the uncontrolled bursting of escaping electrolyte through contact with an ignition source (for example a hot cell connector). In addition, the mechanical forces arising as a result of the expansion can mechanically damage or destroy the outer shell of the battery pack, as a result of which areas of the battery pack that are live are made freely accessible. After bursting, pouch cells continue to function, and therefore thermal runaway can occur. These disadvantages are prevented by the rechargeable battery pack according to the invention.

In a particularly preferred configuration, the interrupter is part of an electrical circuit. The interrupter is preferably part of an electrical circuit into which the pouch cell itself is electrically integrated. The pouch cell can be integrated into the electrical circuit in series connection. A plurality of pouch cells connected in series or a plurality of pouch cells connected in parallel with one another can be integrated into the electrical circuit.

It has proven to be advantageous if the electrical circuit surrounds or delimits the pouch cell or the pouch cells at least in sections. For example, the electrical circuit can thus be arranged around a pouch cell and/or a pouch cell stack in an annular manner.

In a particularly preferred configuration, the interrupter is designed as a separable predetermined breaking point. Such a predetermined breaking point is preferably irreversibly separable. If the interrupter designed as a predetermined breaking point is part of an electrical circuit, it is preferably arranged in such a way that an expansion of the pouch cell and/or the pouch cells causes the electrical circuit or an electrical line of the electrical circuit containing the predetermined breaking point to be severed. By interrupting the electrical circuit, further expanding or swelling of the pouch cell is stopped. The separation of the electrical circuit and/or the predetermined breaking point is brought about by the expansion force which arises when the volume increases in the course of the swelling.

In a further preferred configuration, the interrupter is designed as a preferably reversibly actuable mechanical switch or button. An interruption is preferably carried out mechanically, in particular purely mechanically. The switch or the button is arranged in such a way that an increase in volume of the pouch cell and/or the pouch cells trips the switch or button and thus interrupts the electrical circuit. This prevents a current draw from the pouch cell and/or from the rechargeable battery pack. In addition, further expansion of the pouch cell is prevented. The switch or button can be set up in such a way that a decrease in volume of the cell (regeneration) leads to the electrical circuit closing, as a result of which the rechargeable battery pack is ready again for a current draw.

In a likewise preferred configuration, the interrupter is designed as an irreversibly separating fusible link. The fusible link is preferably arranged in such a way that it first undergoes a cross-sectional narrowing due to beginning swelling, as a result of which the fusible link trips even at a comparatively low current. If the pouch cell were to expand further, the fusible link would break and the electrical circuit would therefore be interrupted. The design of the interrupter as a fusible link is therefore a dual or two-stage current draw fuse for the rechargeable battery pack. In a first stage (slightly swollen pouch cell), the fusible link thus works in its classic function. Mechanical breaking only occurs when the pouch cell is expanded further, which in turn likewise leads to a current interruption.

It has proven to be advantageous if the rechargeable battery pack has a plurality of stacked pouch cells. Each of the pouch cells can have at least one preferably metallic contact area, by means of which said pouch cell is electrically connected to the respectively adjacent pouch cell. A pouch cell can have two preferably metallic contact areas. It is particularly preferred to provide exactly two, preferably metallic, contact areas per pouch cell. The plurality of stacked pouch cells can be connected to one another in series and/or in parallel.

It has proven to be advantageous if the interrupter is defined by the pair of adjacent contact areas, which has a smaller contact surface in comparison to the other contact surface pairs. A force which arises in the course of the expansion of the pouch cell or the pouch cells causes an interruption of the pair of adjacent contact areas which have a smaller contact surface in comparison to the other contact surface pairs. In other words, such a comparatively smaller contact surface only withstands a lower separation force than a pair with comparatively larger contact areas, through which more force can be absorbed. By separating the adjacent contact areas, an electrical circuit including these contact areas is interrupted, as a result of which a current draw from the pouch cell and/or the rechargeable battery pack is irreversibly interrupted in this case.

The interrupter can be defined by the pair of adjacent contact areas, which are electrically and/or mechanically connected to one another by way of a connection with a lower contact force in comparison to the other contact area pairs. In this case, an expansion of the pouch cell and/or the pouch cells causes an interruption of the contact between the adjacent contact areas, as a result of which a current draw from the pouch cell and/or the rechargeable battery pack is interrupted. An interruption due to the lower contact force between two adjacent contact areas is preferably reversible, that is to say such a contact between two adjacent contact areas can be restored by self-regeneration of the cells (volume reduction) and an electrical circuit can thus be closed.

The invention also provides an electric hand-held power tool having a rechargeable battery pack of the type described above. The rechargeable battery pack of the system comprising the hand-held power tool and the rechargeable battery pack can advantageously be developed with reference to the features described above.

Further advantages will become apparent from the following description of the figures. In the figures, various exemplary embodiments of the present invention are represented. The figures, the description and the claims contain numerous features in combination. A person skilled in the art will expediently also consider the features individually and combine them to produce further useful combinations.

BRIEF DESCRIPTION OF THE DRAWINGS

In the figures, identical and similar components are denoted by identical reference signs. In the figures:

FIGS. 1A and 1B show first preferred exemplary embodiment of a rechargeable battery pack according to the invention having an interrupter;

DETAILED DESCRIPTION

Figures 2A, 2B:
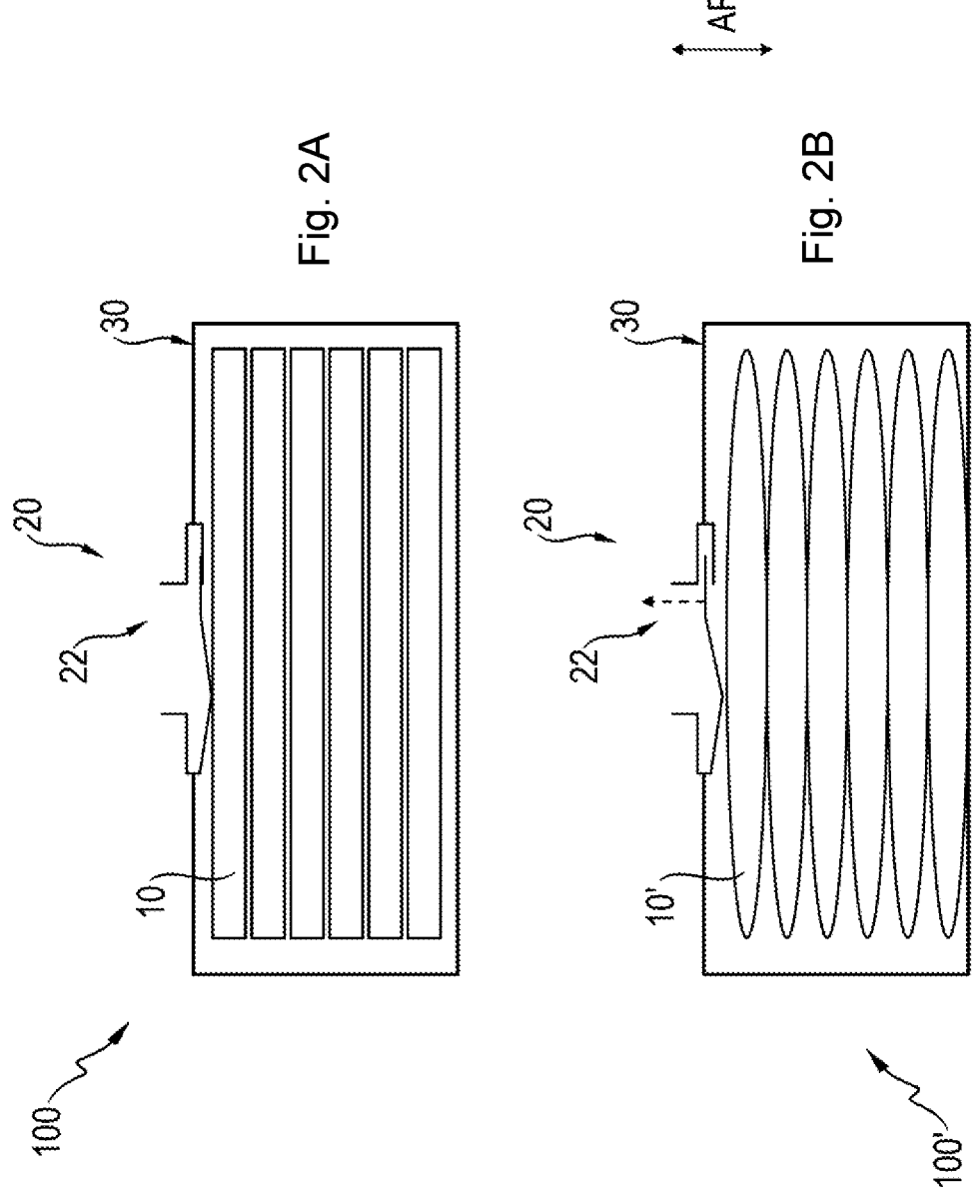
FIGS. 2A and 2B show a second preferred exemplary embodiment of a rechargeable battery pack according to the invention having an interrupter.

A first preferred exemplary embodiment of a rechargeable battery pack 100 according to the invention is illustrated in FIGS. 1A and 1B. In the presently illustrated exemplary embodiment, the rechargeable battery pack 100 has six identical pouch cells 10, which are stacked. In FIG. 1A, the pouch cells 10 are depicted in the new state, that is to say in the non-expanded state. FIG. 1B shows, in turn, the rechargeable battery pack 100 with aged, expanded cells 10'. As can be gathered by looking at FIGS. 1A and 1B together, a stack height a in the new rechargeable battery pack is lower than a stack height b of the aged rechargeable battery pack 100' in FIG. 1B.

It should be noted that, in all of figures, a new rechargeable battery pack is denoted in each case by the reference symbol 100, and an aged rechargeable battery pack is denoted in each case by the reference symbol 100', wherein AR denotes the expansion direction. Likewise, reference number 10 in the figures denotes a new, unexpanded pouch cell. An aged, expanded pouch cell is denoted in each case by the reference symbol 10'.

According to the invention, the rechargeable battery pack 100 has an interrupter 20, which is designed to at least temporarily interrupt a current draw from the rechargeable battery pack 100. The interrupter 20 is tripped by an expansion of the pouch cell 10. In the exemplary embodiment of FIG. 1, the interrupter 20 is part of an electrical circuit 30, which surrounds the stack of pouch cells 10 shown in FIG. 1 in an annular manner. In the exemplary embodiment of FIG. 1, the interrupter 20 is designed as an irreversibly separable predetermined breaking point 21 in the line which is part of the electrical circuit 30. The predetermined breaking point 21 is denoted by a point in FIG. 1A by way of example and is intact in FIG. 1A, that is to say the electrical circuit 30 is electrically and mechanically closed.

By expanding the pouch cell 10'—this is shown in FIG. 1B—the interrupter 20 designed as a predetermined breaking point 21 is separated, which leads to the electrical circuit 30 being opened. In this case, a current draw from the rechargeable battery pack 100 is irreversibly interrupted.

It should be noted that the electrical circuit 30 is only shown schematically in FIGS. 1A and 1B, that is to say an electrical integration of the pouch cell 10 into the electrical circuit 30 is not explicitly shown. An electrical contact of the rechargeable battery pack, which forms an interface to an electric hand-held power tool, is preferably part of the electrical circuit 30.

A second preferred exemplary embodiment of a rechargeable battery pack 100 according to the invention is illustrated in FIGS. 2A and 2B. In the exemplary embodiment shown here, the interrupter is designed as a reversibly actuable mechanical switch. The mechanical switch is integrated into the electrical circuit 30 in series connection. It cannot be seen here that the pouch cell 10 is also electrically incorporated into the electrical circuit 30. FIG. 2A shows the mechanical switch 22 in the closed state, that is to say that current can be drawn from the rechargeable battery pack 100 or from the pouch cells 10.

As can be seen from FIG. 2B, the pouch cells 10' are now shown as aged or expanded. As a result, the switch 22 is now in a disconnected position, as a result of which the electrical circuit 30, in the line of which the interrupter provided as a mechanical switch 22 is integrated, is interrupted.

Figures 3A, 3B:
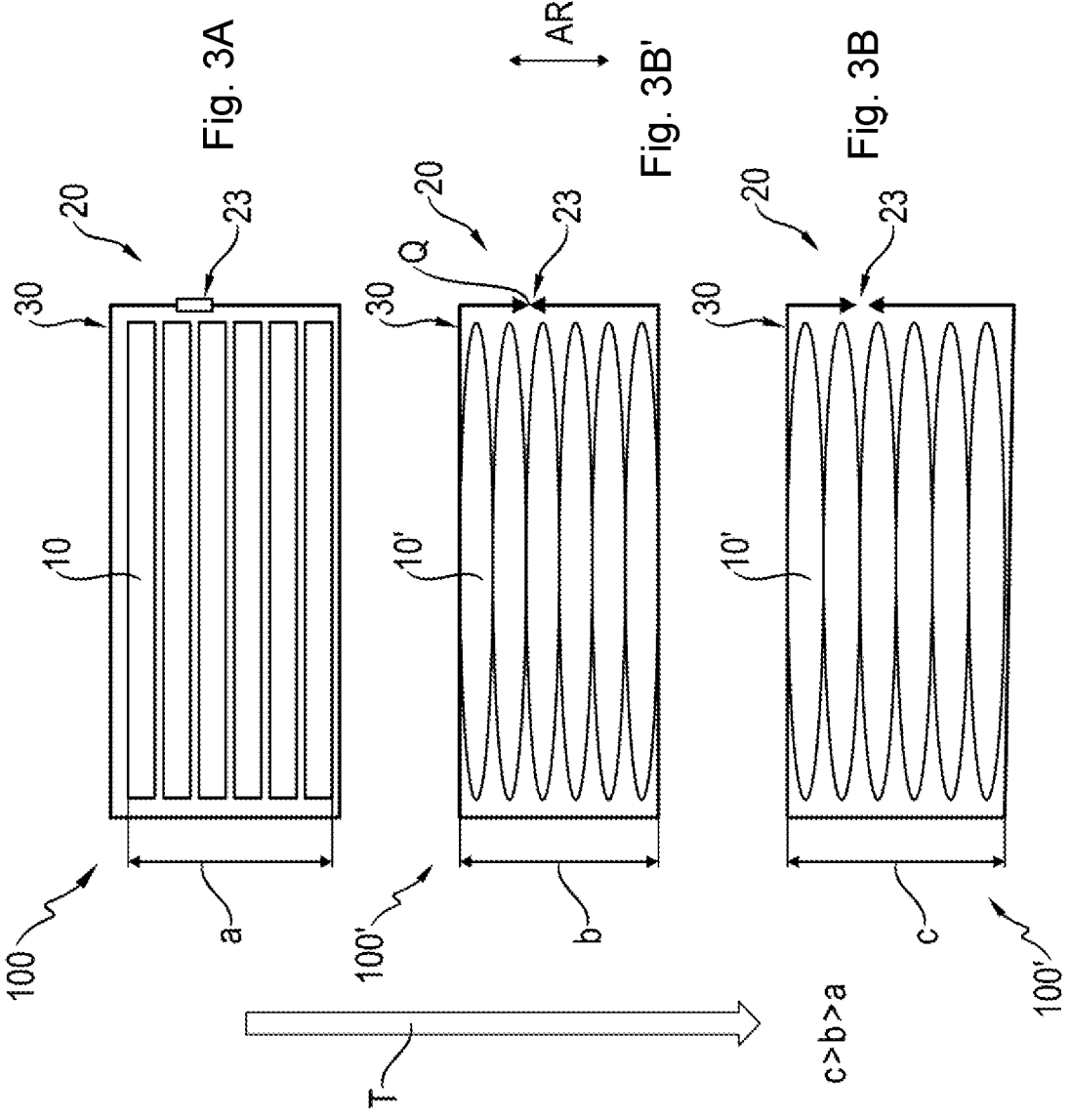
FIGS. 3A, 3B' and 3B show a third preferred exemplary embodiment of a rechargeable battery pack according to the invention having an interrupter.

A third preferred exemplary embodiment is shown in FIGS. 3A, 3B' and 3B. The thick arrow on the left-hand side of the figures indicates an aging process T, wherein the direction of the arrow represents an increasing age or an increasing expansion of the pouch cells 10.

As can be seen from FIG. 3A, the interrupter 20 designed as a fusible link 23 is integrated into the electrical circuit 30 of the rechargeable battery pack 100.

In FIG. 3B', the pouch cells 10' have swelled somewhat. That is to say the height b of the cell stack in FIG. 3B' is greater than the stack height a of the stack consisting of new pouch cells 10 in FIG. 3A.

As can be seen from FIG. 3B', the fusible link 23 has first undergone a cross-sectional narrowing Q. This cross-sectional narrowing Q would trip the fusible link in a state shown in comparison to FIG. 3A at a lower current, that is to say it would melt. In this respect, the fusible link 23 with a cross-sectional narrowing Q already represents a current interruption mechanism 20, since this is tripped by the pouch cell 10 being expanded.

When the pouch cells 10' are expanded further (this is shown in FIG. 3B), the fusible link 23 breaks mechanically, as a result of which the electrical circuit 30 is interrupted. The interruption shown in FIG. 3B is irreversible. A stack height c of the pouch cells 10' is, in the expansion direction AR, greater than the height b of the cell stack in FIG. 3B'.

Figures 4A, 4B:
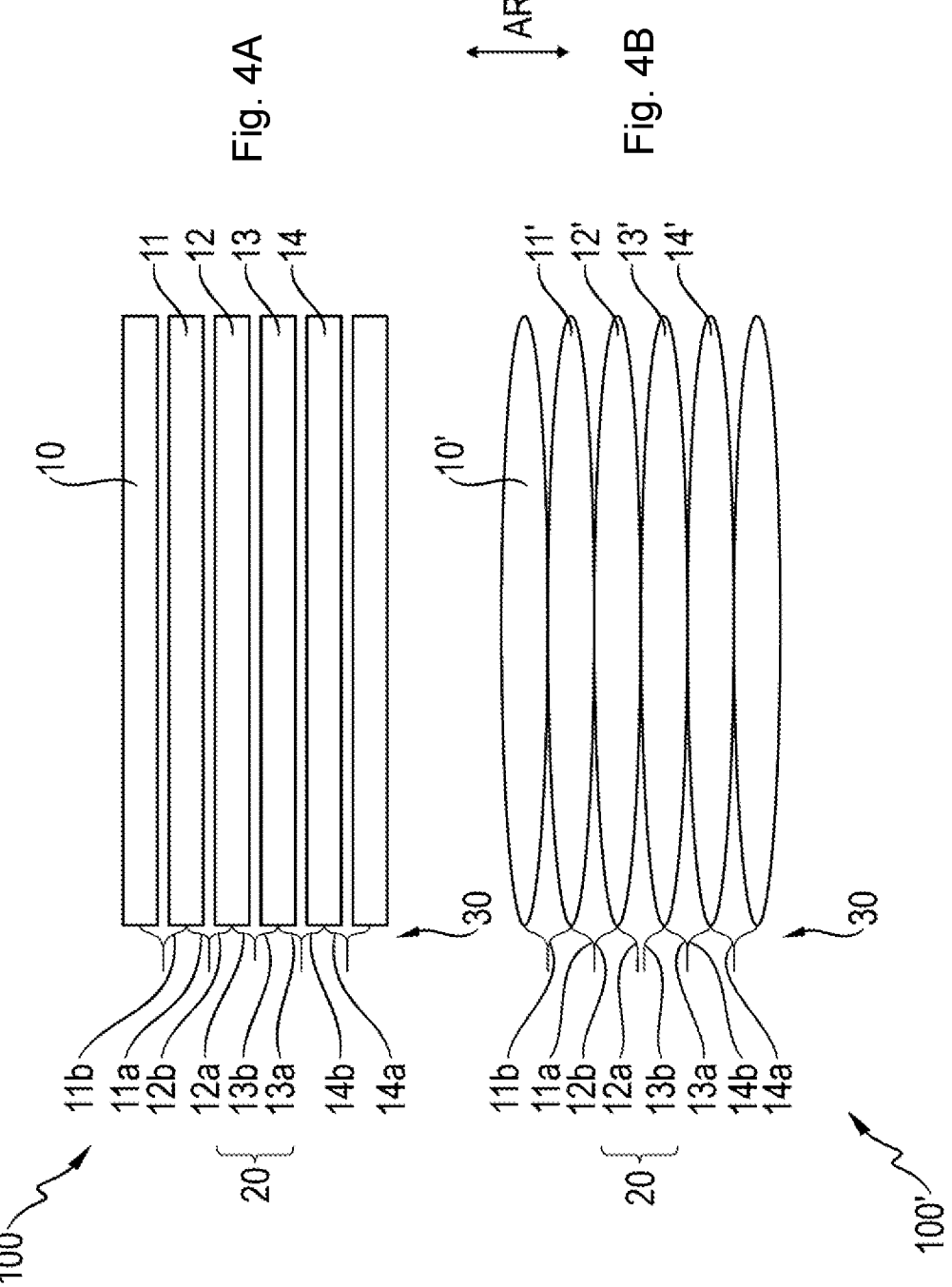
FIGS. 4A and 4B show a fourth preferred exemplary embodiment of a rechargeable battery pack according to the invention having an interrupter.

A fourth preferred exemplary embodiment of a rechargeable battery pack 100 according to the invention is illustrated in FIGS. 4A and 4B. The rechargeable battery pack 100 has a plurality of stacked pouch cells 10, 11, 12, 13, 14. Each of the pouch cells has at least one in this case for example metallic contact area, which projects laterally from the respective pouch cell. For example, the pouch cell 12 thus has a first contact area 12a and a second contact area 12b. The pouch cell 11 has a first contact area 11a and a second contact area 12b. The adjacent pouch cells 11 and 12 are connected in such a way that the second contact lug 12b with the pouch cell 12 is electrically and mechanically connected to the first contact lug 11a of the pouch cell 11. Likewise, the pouch cell 12 is electrically and mechanically connected via its first contact surface 12a to a second contact surface 13b of the pouch cell 13.

As can be seen from FIGS. 4A and 4B, the pair of adjacent contact areas 12a, 13b has a smaller contact surface in comparison to other contact area pairs, such as for example 13a, 14b or 12b, 11a. A force caused in the course of the expansion of the cells 11', 12', 13', 14' leads to a separation of the same contact pair 12a, 13b, with the comparatively small contact surface, from one another, since this contact pairing can absorb a lower force than adjacent contact pairings. As can be seen from FIGS. 4A and 4B, the adjacent contact lugs 12a and 13b each define the interrupter 20, which is part of an electrical circuit 30.

Figures 5A, 5B:
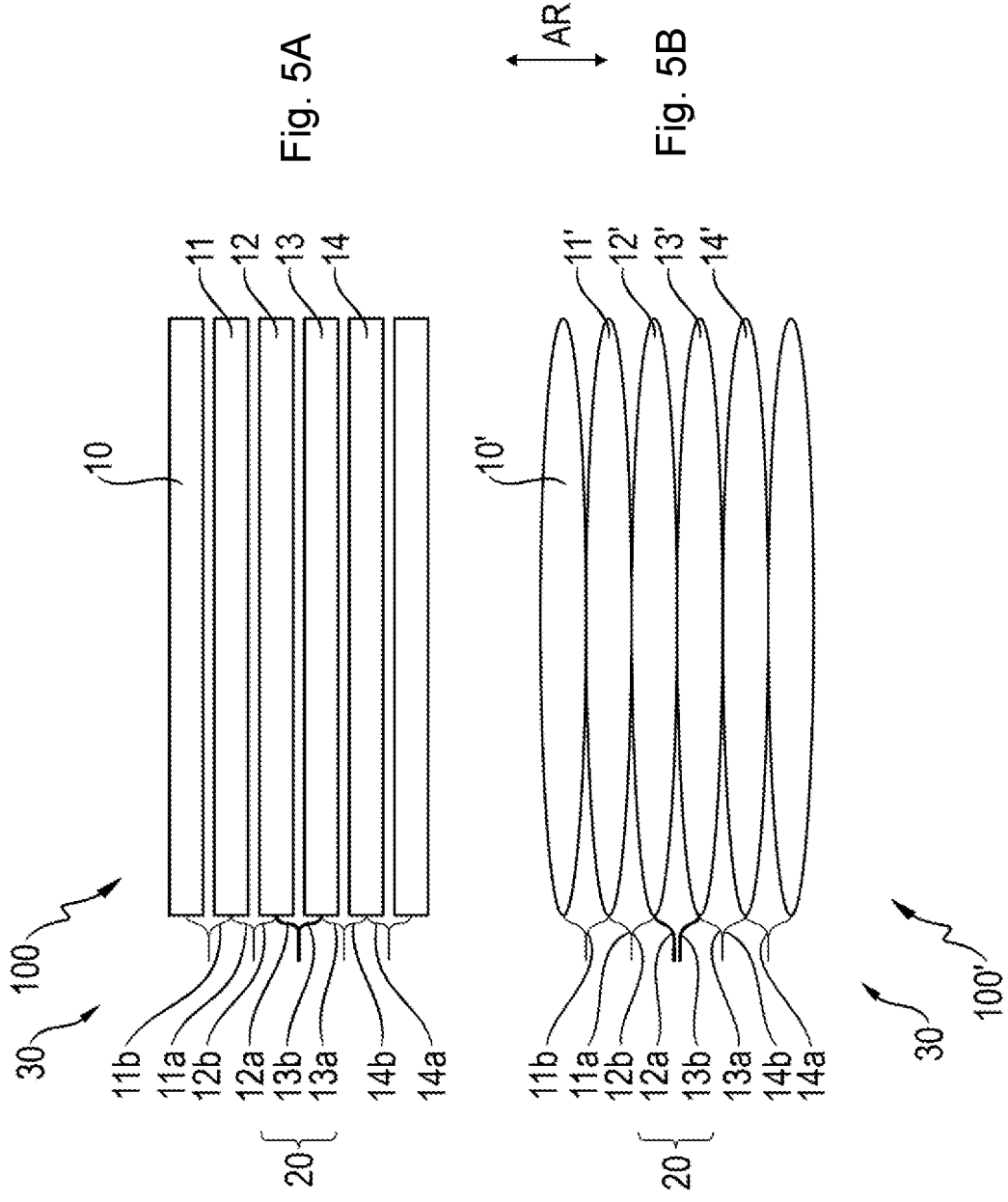
FIGS. 5A and 5B show a fifth preferred exemplary embodiment of a rechargeable battery pack according to the invention having an interrupter.

In contrast to the exemplary embodiment of FIGS. 4A and 4B, in which the pair of adjacent contact areas with the lowest common contact surface defines the interrupter, in the exemplary embodiment of FIGS. 5A and 5B the interrupter is defined by the pair of adjacent contact areas 12a, 13b, which in comparison to the other contact area pairs 13a, 14b and 12b, 11a are electrically and/or mechanically connected to one another by a connection with a lower contact force. Expanding the pouch cells 11', 12', 13', 14' (cf. FIG. 5B) leads first of all to a separation of the adjacent contact areas 12a, 13b, which are characterized by the lowest contact force with respect to one another. In this exemplary embodiment, too, the electrical circuit 30 is separated by the interrupter 20 defined by the contact areas 12a, 13b, as a result of which a current draw from the rechargeable battery pack 100 is interrupted.

LIST OF REFERENCE SIGNS

10, 11, 12, 13, 14 Pouch cell (new)
10', 11', 12', 13', 14' Pouch cell (expanded)
11a, 11b; 12a, 12b; 13a, 13b; 14a, 14b Contact areas
20 Interrupter
21 Predetermined breaking point
22 Switch
23 Fusible link
30 Electrical circuit
100 Rechargeable battery pack
AR Expansion direction
Q Cross-sectional narrowing
T Aging

The invention claimed is:

1. A rechargeable battery pack comprising:
    at least one pouch cell defining a top surface and a bottom surface; and
    an electrical circuit with at least one interrupter designed to at least temporarily interrupt a current draw from the pouch cell or from the rechargeable battery pack, the interrupter tripped by an expansion of the pouch cell;
    the interrupter being designed as a mechanical switch or button;
    the electrical circuit fully surrounding a cross section of the at least one pouch cell so as to encircle the top surface and the bottom surface.

2. The rechargeable battery pack as recited in claim 1 wherein the interrupter is the mechanical switch, the mechanical switch being in series in the electrical circuit.

3. The rechargeable battery pack as recited in claim 1 wherein the interrupter is the mechanical switch and has a movable contact, the moveable contact being in direct contact with the top surface of the at least one pouch cell to trip the interrupter upon swelling of the at least one pouch cell.

* * * * *